US010960824B2

(12) United States Patent
Wagner

(10) Patent No.: US 10,960,824 B2
(45) Date of Patent: Mar. 30, 2021

(54) TRAILER HITCH MOUNTED RECYCLING AND WASTE CONTAINER TRANSPORTING APPARATUS

(71) Applicant: Thomas E Wagner, Fenton, MO (US)

(72) Inventor: Thomas E Wagner, Fenton, MO (US)

(73) Assignee: Wagner Products Company, Fenton, MO (US)

( * ) Notice: Subject to any disclaimer, the term of this patent is extended or adjusted under 35 U.S.C. 154(b) by 0 days.

(21) Appl. No.: 16/602,569

(22) Filed: Nov. 1, 2019

(65) Prior Publication Data

US 2020/0139895 A1 May 7, 2020

Related U.S. Application Data

(60) Provisional application No. 62/766,830, filed on Nov. 5, 2018.

(51) Int. Cl.
*B60R 9/06* (2006.01)
*B60R 11/00* (2006.01)

(52) U.S. Cl.
CPC ......... *B60R 9/06* (2013.01); *B60R 2011/0085* (2013.01)

(58) Field of Classification Search
CPC .......................... B60R 9/06; B60R 2011/0085
USPC .......................................... 224/518–519, 521
See application file for complete search history.

(56) References Cited

U.S. PATENT DOCUMENTS 2,051,265 A 8/1936 Martin
2,338,955 A 1/1944 Metcalf
2,400,103 A 10/1946 Cameron
2,663,474 A 12/1953 Kelly
2,930,500 A 3/1960 Ellis
3,376,986 A 4/1968 Farber
3,740,097 A 6/1973 Parker et al.
4,252,492 A 2/1981 Scothern
4,298,151 A 11/1981 O'Connor
4,381,069 A 4/1983 Kreck
4,400,129 A 8/1983 Eisenberg et al.
4,780,044 A 10/1988 Elskamp
4,787,809 A 11/1988 Zrostlik
4,944,434 A 7/1990 Hamilton
5,209,628 A 5/1993 Hassell
5,221,173 A 6/1993 Barnes
5,738,261 A 4/1998 Dula (Continued)

*Primary Examiner* — Scott T McNurlen
(74) *Attorney, Agent, or Firm* — Paul M. Denk

(57) ABSTRACT

A trailer hitch mounted recycling, transporting, and even a waste container transporting apparatus includes a tubing connector, that secures with the trailer hitch of a vehicle, and having a support plate, that mounts a lifting tube permanently thereon. A pivot rod pivotally secures to the upper end of the lifting tube, and the pivot rod connects with a lifting lever, which when pivoted from a vertical to a horizontal position, allows for movement of a container either onto or off of the ground, in preparation for its transport, or removal from this apparatus. A lifting hook slidably engages with the lifting tube, and connects with a lifting bracket at its upper end, which connects with a short lever, that provides a sliding movement to the lifting hook either upwardly with respect to the lifting tube, or downwardly therefrom, so that its hook device can secure to the container to provide for its lifting, transport, and lowering, after it has been moved to a distant location.

9 Claims, 3 Drawing Sheets

3

C

(56) References Cited

U.S. PATENT DOCUMENTS

| | | | | | |
|---|---|---|---|---|---|
| 6,033,178 | A * | 3/2000 | Cummins | B60R 9/06 | 224/402 |
| 6,164,896 | A * | 12/2000 | Cummins | B60R 9/06 | 224/521 |
| 6,361,264 | B1 * | 3/2002 | Guthrie | B60R 9/065 | 224/521 |
| 8,505,951 | B2 * | 8/2013 | Bohse | B60D 1/52 | 280/491.1 |
| 10,138,058 | B2 * | 11/2018 | Seaburg, Sr. | B65F 1/1468 | |

* cited by examiner

TRAILER HITCH MOUNTED RECYCLING AND WASTE CONTAINER TRANSPORTING APPARATUS

CROSS REFERENCE TO RELATED APPLICATION

This is a nonprovisional patent application that claims priority to the provisional patent application having Ser. No. 62/766,830, filed on Nov. 5, 2018.

FIELD OF THE INVENTION

This invention does relate to a trailer hitch mounted recycling and waste container transporting apparatus, useful for conveying heavy waste containers, particularly when ladened with waste material, to a distant location, for pickup by the trash collector, from select locations. This is an easily transportable apparatus, which works by simple mechanical advantage, included various levers, and the like, to provide for safely lifting and transporting the heavily loaded waste and recycling containers to a distant location for pickup.

BACKGROUND OF THE INVENTION

This invention relates to waste and related containers, even those that may be wheeled, for conveyance or transfer, but provides a lever actuated device that can easily grasp the lifting bar of the container, off the ground, lifted for a clearance distance, and allowed to be moved by a vehicle through the attachment of the transporting apparatus to the trailer hitch of a vehicle, or the like.

Other devices have been created that are designed to transport waste material, and other materials, in an effort to lessen the burden of the user to convey particularly waste or other items, to a more distant location.

For example, U.S. Pat. No. 6,164,896, to Cummins, shows a trash container lifting device, and for transporting a filled trash container to a remote site for pickup. It includes a frame, that may attach to a trailer hitch, that has a manual lever for lifting of the heavy trash container off the ground surface, and incorporates spring means, for providing its mechanical advantage, for lifting a loaded container for transfer. But for its spring device, and since its lever is located approximately centrally with respect to the pickup of the ladened trash container, the mechanical advantage provided is substantially lessened, when compared to the current invention.

Other patented devices for use for lifting, for example, a garbage can, can be seen in U.S. Pat. No. 3,376,986, to Farber, and shows a dolly like mechanism for lifting a ladened trash can, for transport.

An automobile carrier is shown in U.S. Pat. No. 2,338,955, to Metcalf, for use for lifting other items for conveyance purposes.

U.S. Pat. No. 2,409,103, shows a related type of device, pivotally mounted proximate an early trailer hitch, for use as a luggage carrier.

Other patented devices that show means for conveyance and dumping of a load, can be seen in the vehicle dump bed U.S. Pat. Nos. 3,740,097, 4,944,434, shows another automobile portable hauler. U.S. Pat. No. 4,298,151, shows a carrier rack that attaches to the back of a vehicle. U.S. Pat. No. 2,663,474, shows an outboard motor carrier that may be attached to the back of a vehicle. U.S. Pat. No. 4,252,492, shows a detachable lift unit for pickup trucks. It incorporates a load carrying platform. U.S. Pat. No. 5,221,173, shows a multi-vehicle transport system for bulk materials in confined areas.

The patent to Martin, U.S. Pat. No. 2,051,265, shows another form of carrier for a vehicle. The patent to Ellis, U.S. Pat. No. 2,930,500, shows another carrier rack to function as an asphalt roller, as an alternative usage. U.S. Pat. No. 4,381,069, shows another outboard motor carrier for a motor vehicle. U.S. Pat. No. 4,400,129, shows a wheelchair carrier and loading device, for attachment to a vehicle. U.S. Pat. No. 4,780,044, shows a device for controlling a loading platform for transport vehicles. U.S. Pat. No. 4,787,809, shows a hydraulic lift gate for the back of a truck bed. U.S. Pat. No. 5,209,628, shows a self-loading dolly mount apparatus. Finally, a vehicle hitch for securing a hand truck, cart, or other small load, to the back of a truck, can be seen in U.S. Pat. No. 5,738,261. These are all examples of known prior art relating to the subject matter of the current invention.

SUMMARY OF THE INVENTION

This invention contemplates the assembly of various components, such as frame members, lever arms, trash container engaging means, and a support means, for use for lowering to engage the lifting bar of the standard trash container, and through the use of a lever arm, pivoting it to an over center position to provide for lifting of the trash container off of the ground, for conveyance of the ladened container to a location where the trashmen or waste haulers can unload said container during a pickup.

Essentially, the concept of this invention is for use principally in combination with a vehicle, and its trailer hitch, normally used for other purposes, so that particularly when the homeowner or business owner needs to haul a heavily ladened waste or other container to a remote location, it could be done so, rather simply, through the usage and application of this current invention. For example, many municipalities have rules and laws that require the waste containers to be located at a position adjacent the edge of the street, so as to conveniently dispose the container for pickup by the trashmen, at designated times. Frequently, particularly in the more affluent neighborhoods, the home may be many feet distant from the street, and in some cases, may be even be 100 feet, 100 yards, or even 200 yards, away from the street. For the homeowner to convey the heavily ladened trash container over that distance, can be challenging. Particularly if the homeowner might be elderly. Furthermore, if the homeowner does not have a paved driveway, but has a graveled road, pulling such a trash container over such gravel can be burdensome and lead to its early failure. The bearings in the wheels of such trash containers are not made to encounter and absorb the heavy impact, of pulling the heavy waste container over such a roadway, to get it out to the street edge, as required once or twice a week, in preparation for a trash pickup. And, in those instances where there may be devices for connecting a trash container to the back of a vehicle, and allow its wheels to provide for its support, as the vehicle drives it out to the street's edge, can also lead to significant impact, and the early destruction of the waste container, after usage for a few months application.

The current invention is designed to remedy that problem, with a device that is simply assembled with a series of components, as previously reviewed, to allow for the heavily ladened trash container to be lifted, through the use of much lesser force, simply through the use of mechanical advantage, to raise the trash container, and to allow it to be transported, and then pivoted into contact with the ground, for positioning for pickup by the waste hauling company.

The concept of this invention is to provide a container lifting and trailer hitch mounted, lever acutated device designed, to temporarily attach the container to a motor vehicle, through its trailer hitch, for safe transporting both to and from the disposal area, or the area where the trash container can be picked up, by the commercial operator. The device consist of a square piece of steel tubing that extends out and connects with the trailer hitch, or extends from the back of the trailer hitch, and then has a curved upwardly portion, generally at an approximate 45° angle, more or less, to a point at which a steel plate connects, with the tubing, with the steel plate having a series of aligned holes, of even spacing, provided along its center line, which is attached to the upper end of the angulated tubing. This steel plate is then attached to a piece of rectangular steel tubing, which forms a lifting tube, and which also contains a series of holes of even spacing along its center line. Then, one or more securing devices, such as bolts, are used to attach the plate to the rectangular lifting tube, by means of the aligned holes, which provides and allows for the vertical adjustment of the lifting device, in its assembly.

At the top of the apparatus is another steel tube, which extends outwardly to either side of the lifting tube, and which allows for either a right or left side operation of the device. A modification also allows for two devices to be joined together, at that location, by a straight tube which would then allow for two containers to be transported, side by side, by one vehicle, during usage and application.

Attached to the end of this tube is a lifting lever, which when rotated upwardly, to a vertical position, will lift and hold the container upwardly, off the ground, by a few clearance inches. By pivoting the lifting lever over center, it can hold the container off the ground during transit. Also attached to the top of the rectangular lifting tube are two integral bushings, functioning as bearings, that allow for the rotation of the lifting arm or lever, that extends through these two laterally aligned bearings. Between the two bearings is a third bushing, that is attached by means of a screw, roll pin, or other fastener to a short actuator lever. The short lever and the lifting lever provide the advantage for lifting and holding the ladened container during transit.

Attached to this bushing is said actuator arm, which has great leverage, due to the ratio of its short length with respect to length of the lifting lever. The actuating arm is attached by a clevis pin, screw, or connector, to a formed steel lifting bracket as will be subsequently described. The lifting bracket slideably engages upon the lifting tube and is held in position by a pair of lateral brackets. The lifting bracket is attached by clevis pins, screws, or the like, to a formed steel lifting hook, which is contained by means of two steel brackets or guides, which are fixed to either side of the lifting tube, by a pin, or the like. The opposite end of the lifting hook secures to the lower end of the lifting bracket, and by a pin, or the like.

Thus, when the lifting lever is rotated vertically upwardly, it turns its pivot rod or tube, and its various lifting hook and brackets, to provide for the lifting bracket to elevate upwardly, and to lift the waste container, by means of its lifting bar connector. Then, when the lifting lever is rotated approximately 180° rearwardly, or in the opposite direction, it allows the lifting bracket to lower, and thereby locate the waste container on the ground, after it has been returned to its place of household usage.

It is, therefore, the principal object of this invention to provide a simple construction of various component parts, that through mechanical leverage can allow for lifting of a heavily weighted waste container, off of the ground, in proximity to the back of a vehicle, through interconnection with its trailer hitch, to allow for transport of the waste container to a distant location, without touching the ground, during its transit. Then, the device can simply be pivoted downwardly, to allow for locating of the waste container at a distant location, such as along the edge of the street, as previously reviewed, in preparation for pickup and removal of its waste material, by the commercial operator. Then, the empty waste container can be reapplied to the container transporting apparatus of this invention and returned up the driveway or roadway to the home or building, to be positioned for reception of further waste material, for a period of time.

Another object of this invention is to provide a simple mechanical means for use of small amount of force to lift a heavily ladened waste container off of the ground in preparation for its transport.

A further object of this invention is to provide a waste container transporting apparatus that is conveniently designed to dispose its interconnection means with the trailer hitch of a vehicle, by being in alignment therewith, so it can easily be connected to the vehicle, in preparation of for its lifting and transport.

Another object of this invention is to provide a convenient waste container transporting apparatus that incorporates various mechanical means, and slide means, that operate in conjunction with a leverage device, to allow the heavily ladened waste container to be easily lifted, to provide enough clearance to provide for its transport, to a remote location, or back again.

A further object of this invention is to provide means for transporting a container of parts around a plant when they need to be moved to a different location for further usage.

These and other objects may become apparent to those skilled in the art upon review of the summary of the invention as provided herein, and upon undertaking a study of the description of its preferred embodiment, in view of the drawings.

BRIEF DESCRIPTION OF THE DRAWING

In referring to FIG. 1, it shows the assembled trailer hitch mounted recycling and waste container transporting apparatus of this invention, fully assembled for usage.

DESCRIPTION OF THE PREFERRED EMBODIMENT

Figure 1:
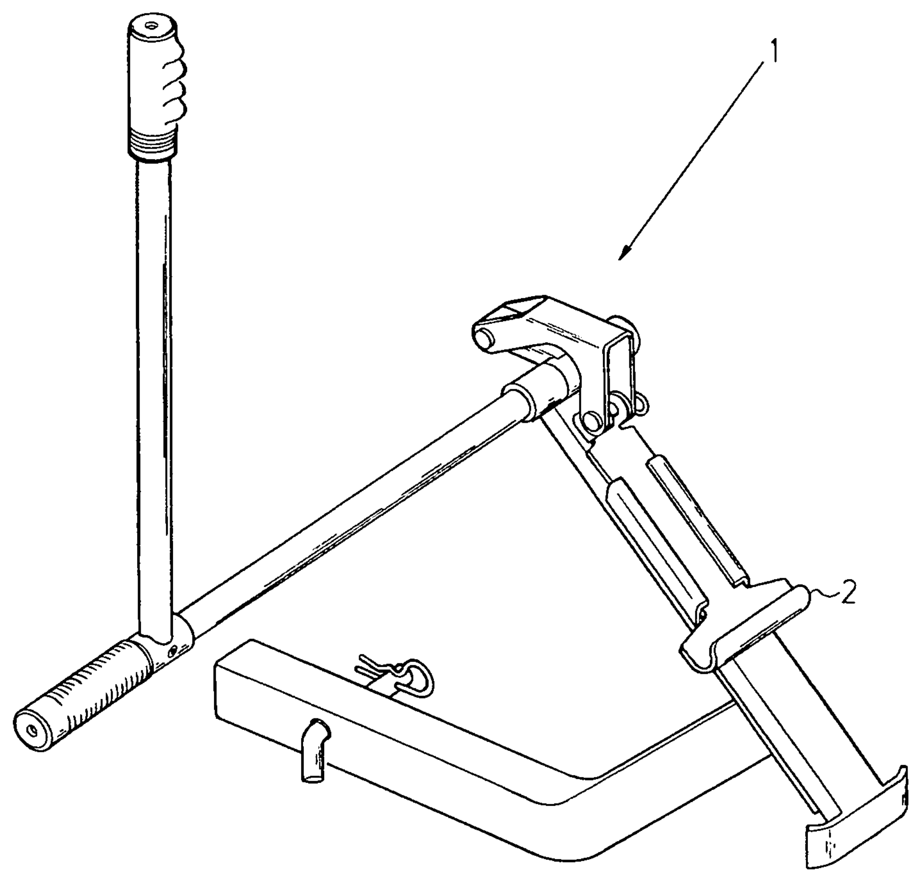

In referring to the drawings, and in particular FIG. 1, therein is shown the trailer hitch mounted recycling and waste container transporting apparatus 1 of this invention. The device connects to the trailer hitch of a vehicle, generally shown at H, as in FIG. 3. The device easily lifts any universal waste or recycling container, by hooking under the bar that normally locates on the front of the container, with a hooking or connecting device 2 readily disclosed. This apparatus, which is rather light weight, can be easily adjusted upwardly or downwardly to match the height of most any trailer hitch H, available for usage in the art.

Figure 2:
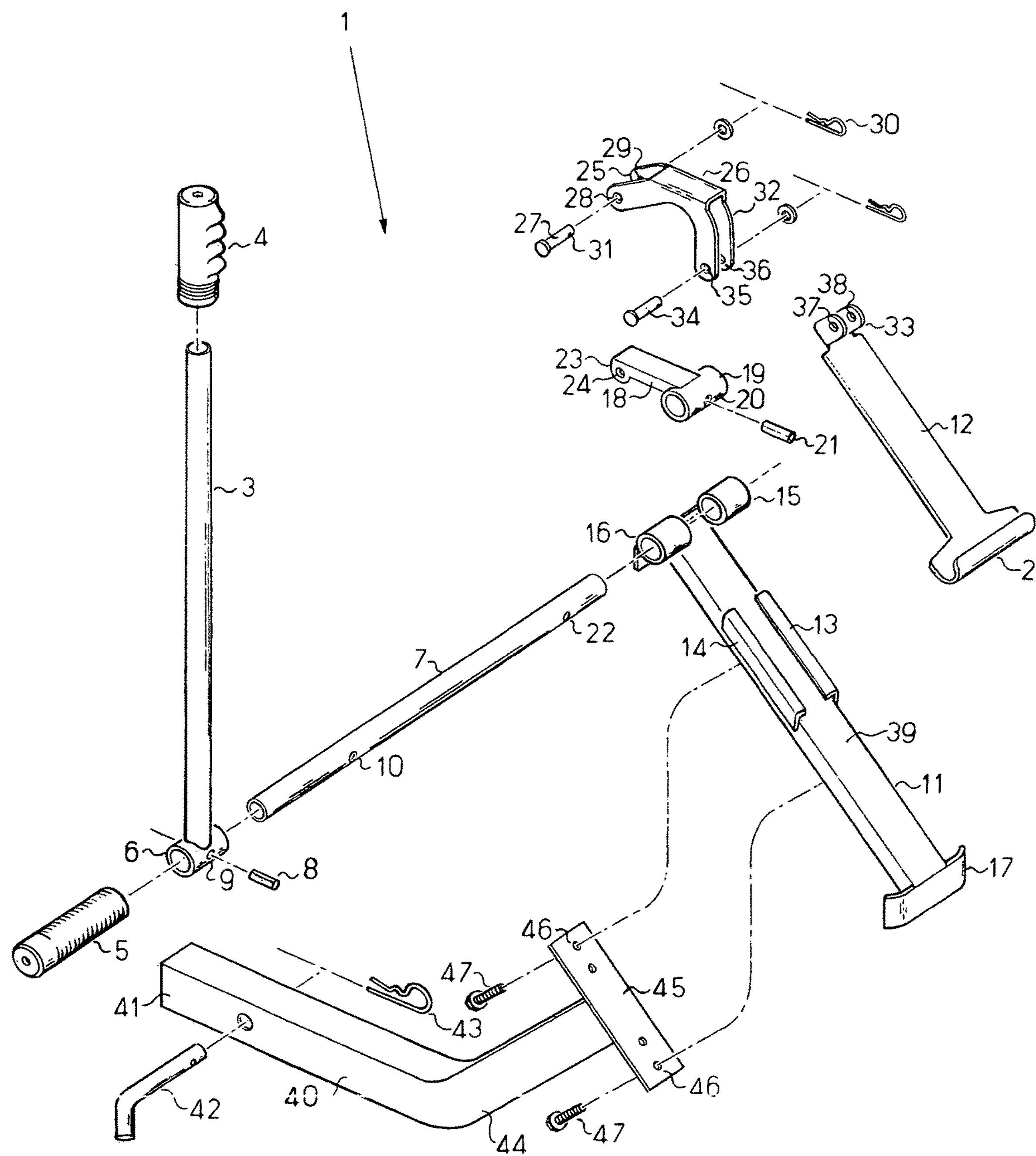
FIG. 2 is an exploded view of the various components that make up the transporting apparatus of this invention.

As can be seen in FIG. 2, an exploded view of the waste container transporting apparatus 1 of this invention is readily disclosed. Initially, it includes a lifting lever 3 that includes a hand grip 4 which is engaged by the stabilizing grip to the side end of the tube 7 and its lever 3. This is the lever that provides for the mechanical advantage that allows for its pivoting, generally from an upright vertical carrying position, to a downwardly approximately 180° position, during usage, to provide for the raising or lowering of the waste container C, as can be noted in FIG. 3. The lifting lever 3 has a perpendicular bushing, as at 6, provided at its lower end, and this busing fits onto the pivot rod or tube 7 and is pinned thereto, by means of the pin 8 that extends through the aperture 9 in addition to the aperture 10 to hold these two components together.

A slide tube or plate 11 provides the primary support for holding the lifting hook 12 upon its upper surface, embraced by the lateral brackets 13 and 14, as the lifting hook 12 slides upon the upper surface of the tube 11, as can be noted. The upper end of the slide tube 11 has a pair of integrally connected bearings 15 and 16, and the end of the pivot tube 7 fits therethrough and is generally secured for pivotal movement within the bearings, as will be described. Most of the pivot tube 7 extends laterally, where it connects with its lifting lever 3, so that the lifting lever has side clearance from the waste container C, that is mounted thereon, during usage. The lower end of the lifting tube 11 has a brace, or connector, as at 17, and this biases against the lower edge of the waste container, when it is mounted onto the transporting apparatus of this invention.

What provides for the mechanical advantage through usage of this invention, is the application of a short lever 18 to the upper end of the slide tube 11. The short lever 18 has an integral bushing 19 and it fits within the spacing between the bearings 15 and 16, provided at the upper end of the lifting tube 11. As can be noted, its bushing 19 also has an aperture 20 provided therein, and the right end of the pivot tube 7 fits through the bushing 19, as it also inserts through the bearings 15 and 16, and the pivot tube 7 is pinned, by means of the pin 21, to the bushing 19, as can be noted. The pin 21 inserts through the aperture 20, and in addition locates and is pressure fitted within the aperture 22 at the right end of the pivot tube 7, as can be noted.

The opposite end of the short lever 18 has an integral boss 23, having an aperture 24 provided therethrough, and it is disposed for connecting with the extending bifurcated end 25 of the lifting bracket 26 as can be seen. When the bifurcated end 25 is aligned with the boss 23, the pin 27 locates through the various apertures 24, and 28 and 29, as can be noted. A spring clip 30 can secure these components together, extending through the aperture 31 of the pin 27.

The opposite end of the lifting bracket 26 has a further bifurcated member, as noted at 32, and this portion of the lifting bracket is designed for being pinned to the upper end of the lifting hook 12, as at 33, by the extension of the pin 34 through the aligned aperture 35 and 36, and through the apertures 37 and 38 provided through the bifurcated end 33 of the lifting hook 12, as noted. The lifting bracket 26 forms the linking means for the device.

Then, at the lower end of the lifting hook 12, is that hook member or connector 2 that engages the approximate lifting bar of the waste container, when it is prepared for lifting of said container off of the ground, for transport.

It is to be noted that through the lifting bracket 26, the lifting hook 12 can slide upon the upper surface 39 of the slide tube 11, from a downward position, where the hook 2 may engage the lifting bar of the waste container, to a further upward position, as when the lifting lever 3 is pivoted vertically upright, for sliding the lifting hook 12 upwardly, within its slide tube 11, to lift the heavily ladened waste container off of the ground, for transport. It is the leverage that is generated between the extra length of the lifting lever 3, and the much shorter lever 18, that conveniently allows for much lower force to lift such a heavily ladened waste container upwardly, by a few inches, during manipulation of such a container in preparation for its transport, as previously reviewed.

As can also be seen in FIG. 2, there is a tubing connector 40, that includes a horizontally disposed portion connecting at the front end 41 is what connects with the trailer hitch H at the back of the vehicle, and is secured into position by means of the pin device 42 as can be seen. A spring clip 43 may hold the pin device 42 in position, after it has been interconnected with the trailer hitch H, of the vehicle. The opposite end of the tubing connector 40 is inclined upwardly, as at 44, at an approximate 45° angle, more or less, and is interconnected or welded to a support plate 45, as can be seen. The support plate has the series of apertures 46 provided therethrough, and fasteners, as at 47, may be extended therethrough, and secure the support plate to the underside of the slide tube 11, which also contains a series of aligned apertures (not shown), so that when the apparatus is adjustably attached to the support plate, it will be in a convenient position to have its lifting hook 12 slid downwardly, and locate its hook 2 in the region of the approximate lifting bar of the waste container, such that when the lever 3 is then pivoted back upwardly, into the position as shown in FIG. 2, it lifts the waste container off of the ground, for a few inches, but sufficient clearance to allow the container to be transported, by the vehicle, to a distant location, without the container contacting the ground, during such movement.

Figure 3:
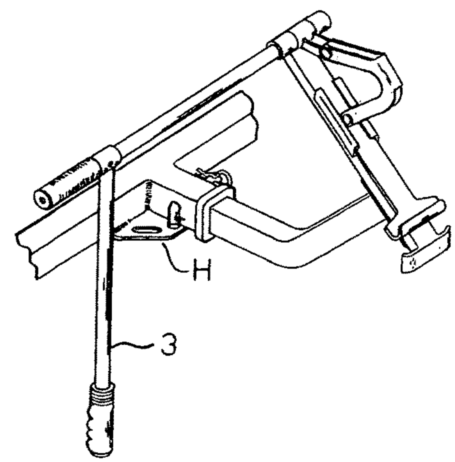
FIG. 3 shows the transporting apparatus connecting to the trailer hitch at the back of a vehicle, and its lever pivoted downwardly to provide for lifting of the heavily ladened trash or other container off of the ground.

FIG. 3 shows how the waste container C is on the ground, by the pivoting of the lifting lever 3 downwardly, into a vertical lowered position.

Figure 4:
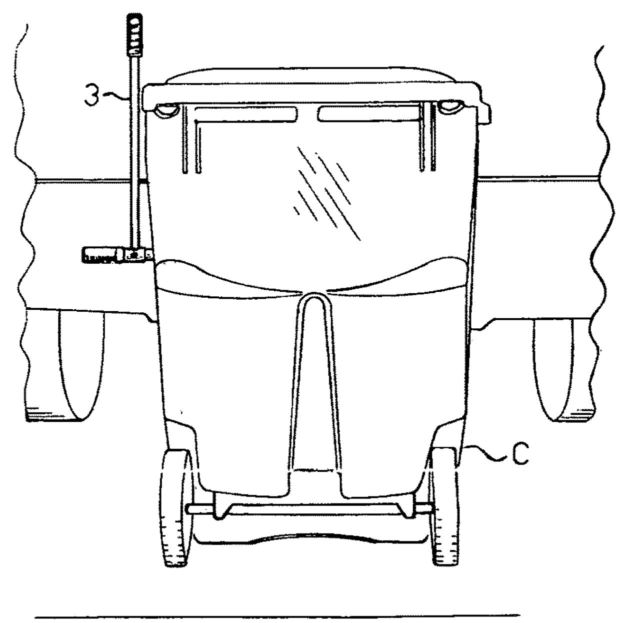
FIG. 4 provides a back view of the device, lifted upwardly off of the ground, and showing its lifting lever locating upwardly, to provide for the necessary lifting and clearance of the waste container off of the ground.
Figure 5:
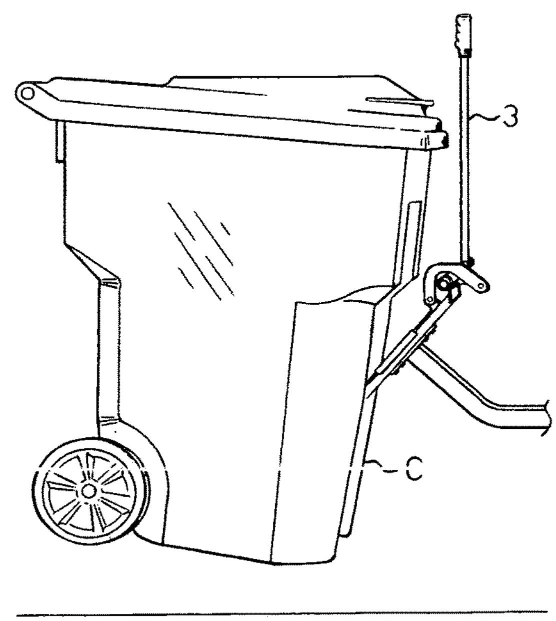
FIG. 5 is a side view of the lifted container of FIG. 4.

FIG. 4 shows a back view of the container being elevated, behind the back of a pickup truck, through attachment with its trailer hitch. FIG. 5 also shows the container raised upwardly, off of the ground, as can be noted. When the waste container is to be lowered, the lifting lever 3 will be pivoted rearwardly, approximately 180°, and that allows the lifting hook 12 to slide downwardly, relative to its sliding tube 11, lowering the waste container onto the ground, for its separation from this apparatus after usage.

The pivot tube 7 may have extended length, and more than one support plate 45 may be provided spaced apart, but integrally connecting, with the end of the angulated portion 44, so that actually a pair of such sliding tubes 11, can connect with the pair of spaced apart plates 45, to allow for lifting and transporting of a pair of ladened containers, at the same time, through usage of the apparatus of this invention.

The foregoing provides a general description of the various mechanical components that are assembled together to provide the transporting apparatus of this invention. The device is relatively light weight, can be easily located for attachment to the trailer hitch, and because of the mechanical advantage developed through the ratio between the lifting lever 3, and the short lever 18, even heavily ladened waste containers, full of trash, or other materials, can be easily elevated, through pivoting of the lifting lever 3, up off the ground, to provide for transport of the ladened container C, to another location. As identified, the device can be used for transporting a waste container from one location to another, but it is just as likely that the device could easily be used around a plant, where manufactured goods or other devices may be located within the container C, lifted off the ground, and transported to another location, through usage of this device as a transporter means, for providing conveyance, through the exertion of little force, to another location for usage.

Variations and modifications to the subject matter of this invention may occur to those skilled in the art upon review of the development as provided herein. Such variations, if within the spirit of this invention, are intended to be encompassed within the scope of any claims to patent protection issuing herein. The summarization of the invention as previously provided, its description of the preferred embodiment, and its depiction in the drawings, are primarily set forth for illustrative purposes only.

I claim:

1. A ladened container lifting and transporting apparatus for use for gripping a container, lifting said container an elevated distance off the ground, in preparation for transporting the container to another location, and lowering the container, for positioning and separation from said apparatus, during usage, the apparatus comprising:

a lifting lever, a short lever, and a pivotal rod extending between said lifting lever and said short lever to obtain substantial mechanical leverage between said levers when said lifting lever is pivoted select degrees for elevation of a ladened container;

a lifting tube pivotally retaining said pivotal rod, and a lifting hook slideably supported upon said lifting tube, and said lifting hook having a connector provided proximate its bottom end to be attached to the ladened container, and to lift the container when said lifting lever is pivoted in one direction;

a linking means securing between said short lever and the upper end of said lifting hook to pull said lifting hook upwardly and elevate said ladened container when said lifting lever is pivoted in one direction, and to lower said container downwardly when said lifting lever is pivoted in another direction; and a support member securing with said lifting tube at one end and said support member securing with the trailer hitch of a vehicle at its other end to allow for transfer by the vehicle of the ladened container to another location during usage of said apparatus.

2. The ladened container lifting and transporting apparatus of claim 1, wherein said apparatus is useful for transporting a ladened waste container.

3. The lifting and transporting apparatus of claim 1, wherein said support member includes a tubular connector, for securing with the trailer hitch of a vehicle, and said tubular connector having an opposite end extending angularly upwardly, a support plate securing with the support member, and disposed for securing with said lifting tube, during assembly of the apparatus for usage.

4. The lifting and transporting apparatus of claim 3, wherein said lifting tube has a pair of brackets provided at its sides, and said brackets embracing the lifting hook for slidable movement upon said lifting tube during its application.

5. The lifting and transporting apparatus of claim 4, wherein said lifting hook has said connector at its bottom end, and has a bifurcation at its upper end, with the linking means interconnecting between the bifurcated upper end of the lifting hook, and connecting with the short lever to provide means for forcing sliding movement to the lifting hook relative to the lifting tube when the lifting lever is pivoted select angular degrees.

6. The lifting and transporting apparatus of claim 5, wherein a pair of support plates secure with the upwardly angulated portion of the tubular connector, to allow for the attachment of a pair of lifting and transporting apparatuses to the trailer hitch of a vehicle.

7. The lifting and transporting apparatus of claim 5, wherein said lifting lever is rigidly connected with one end of the pivotal rod, and said pivotal rod is pivotally connected to the upper end of the lifting tube, and the short lever is rigidly connected with the opposite end of said pivotal rod, said short lever connects with the linking means, so that when the lifting lever is pivoted to select degrees, the short lever pivots and shifts the linking means to provide for sliding of the lifting hook relative to the lifting tube for raising or lowering of the ladened container during usage of said apparatus.

8. The lifting and transporting apparatus of claim 7, wherein the bottom end of the lifting tube has a brace, for bracing against the bottom of any ladened container to brace it against the apparatus as the lifting hook elevates the container upwardly off of the ground.

9. The lifting and transporting apparatus of claim 8, wherein when said lifting book is slid to provide for elevation of the ladened container secured with the apparatus, when the lifting lever is pivoted over center, and forwardly of the apparatus, it holds the ladened container in place until it is released through the reverse pivot of the lifting lever into a lowering position of the apparatus during usage.

* * * * *